(12) United States Patent
Norris et al.

(10) Patent No.: US 8,167,538 B2
(45) Date of Patent: May 1, 2012

(54) TORQUE MONITORING APPARATUS

(75) Inventors: Chris Norris, Indianapolis, IN (US); Matt Wilkinson, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 814 days.

(21) Appl. No.: 12/252,407

(22) Filed: Oct. 16, 2008

(65) Prior Publication Data

US 2010/0098528 A1     Apr. 22, 2010

(51) Int. Cl.
*F01B 25/26* (2006.01)
(52) U.S. Cl. .................................. 415/118; 73/862.338
(58) Field of Classification Search .................. 415/118; 73/862.338
See application file for complete search history.

(56) References Cited

U.S. PATENT DOCUMENTS

| | | |
|---|---|---|
| 4,809,557 A | 3/1989 | Maurer et al. |
| 5,067,354 A | 11/1991 | Kawai |
| 5,228,349 A | 7/1993 | Gee et al. |
| 5,450,761 A | 9/1995 | Zilberman et al. |
| 5,969,269 A | 10/1999 | Munyon et al. |
| 6,439,067 B1 | 8/2002 | Goldman et al. |
| 6,679,126 B2 | 1/2004 | Dalton et al. |
| 6,782,766 B2 | 8/2004 | Parkinson |
| 6,981,423 B1 | 1/2006 | Discenzo |
| 7,093,504 B2 | 8/2006 | Southward |
| 7,322,250 B1 | 1/2008 | Discenzo |
| 7,392,714 B2 | 7/2008 | Maguire et al. |
| 7,665,373 B2 * | 2/2010 | Sakers et al. ............. 73/862.338 |

* cited by examiner

*Primary Examiner* — Quoc Hoang
(74) *Attorney, Agent, or Firm* — Krieg DeVault LLP

(57) ABSTRACT

A torque monitoring apparatus is disclosed herein. The torque monitoring apparatus includes a hub extending along an axis of rotation between first and second opposite ends. The torque monitoring apparatus also includes a plurality of spokes positioned on the hub and extending radially outward from the hub to respective distal ends. The torque monitoring apparatus also includes a plurality of projections spaced from the plurality of spokes along the axis of rotation. Each of the plurality of projections extends radially outward from the hub to respective distal ends. The plurality of projections are thinner along the axis than the plurality of spokes.

20 Claims, 5 Drawing Sheets

_US 8,167,538 B2_

TORQUE MONITORING APPARATUS

BACKGROUND OF THE INVENTION

1. Field of the Invention

The invention relates to an apparatus operable to transmit torque between an input shaft and an output shaft and also includes structures that can move relative to one another for determining the level of torque being transmitted.

2. Description of Related Prior Art

A rotating shaft driving a load, such as another shaft, a gear train, or some other structure, is susceptible to torsional strain. Continuous strain on a loaded shaft may result in a loss of power transmission efficiency, or may result in shaft deformation, or in breakage of the shaft. Dynamic torque or strain fluctuations can exacerbate mechanical and fatigue damage. It is therefore desirable to apply some structure or device to measure the torque on the loaded shaft.

SUMMARY OF THE INVENTION

In summary, the invention is a torque monitoring apparatus. The torque monitoring apparatus includes a hub extending along an axis of rotation between first and second opposite ends. The torque monitoring apparatus also includes a plurality of spokes positioned on the hub. The plurality of spokes extends radially outward from the hub to respective distal ends. The torque monitoring apparatus also includes a plurality of projections spaced from the plurality of spokes along the axis of rotation. Each of the plurality of projections extends radially outward from the hub to respective distal ends. The plurality of projections are thinner along the axis than the plurality of spokes.

BRIEF DESCRIPTION OF THE DRAWINGS

Advantages of the present invention will be readily appreciated as the same becomes better understood by reference to the following detailed description of exemplary embodiments when considered in connection with the accompanying drawings wherein.

DETAILED DESCRIPTION OF THE EXEMPLARY EMBODIMENTS

Figure 1:
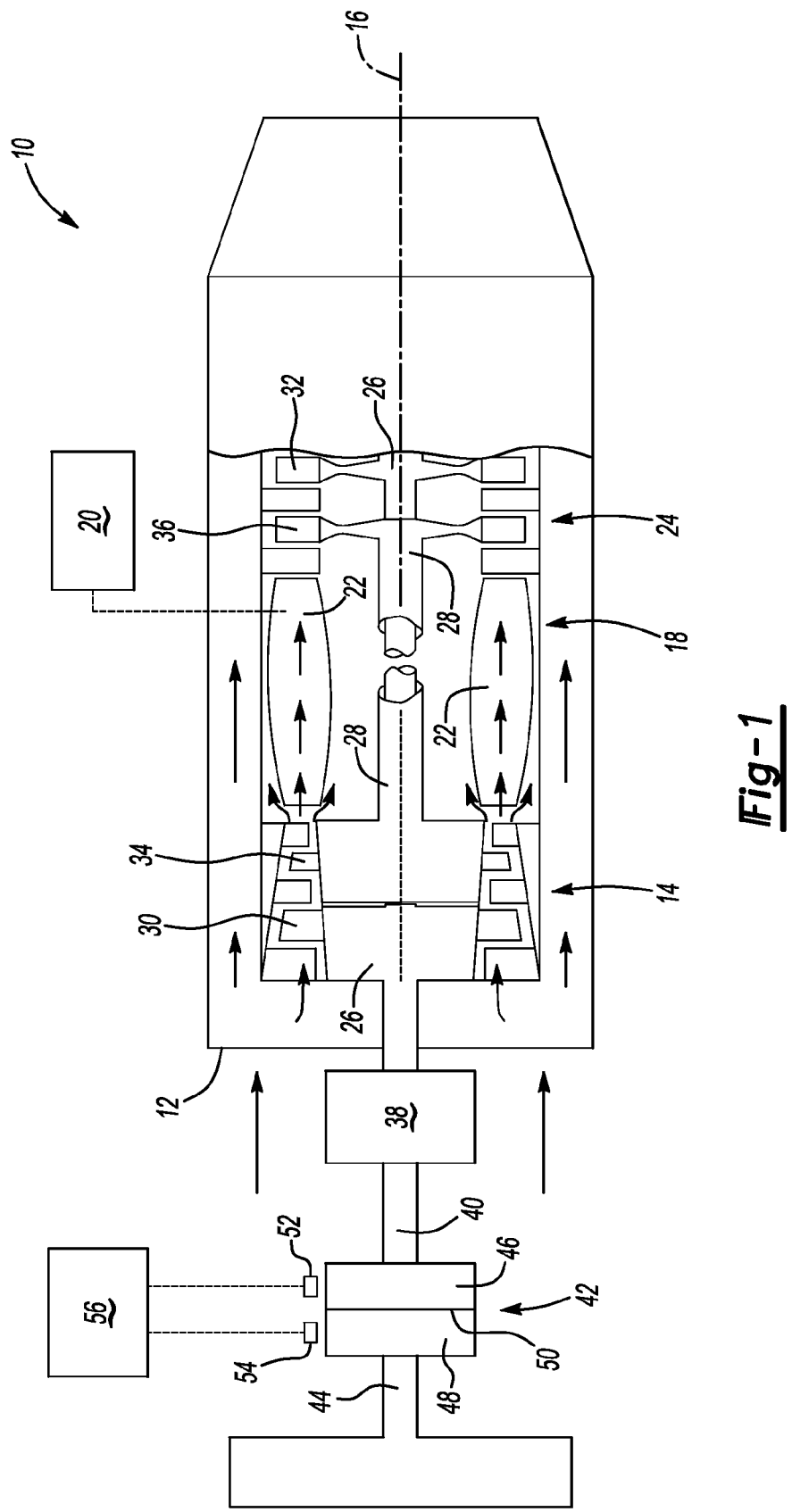
FIG. 1 is a schematic of a turbine engine which incorporates an exemplary embodiment of the invention.

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all of the embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The exemplary embodiments of the present invention provide improved torque monitoring devices. The exemplary torque monitoring devices can be more axially-compact than prior art torque monitoring devices. The novel and non-obvious improvement in axial compactness can be enjoyed in the exemplary embodiments by forming a first set of radial projections or spokes thicker along the axis of rotation than a second set of radial projections. An improved method of monitoring torque can also be applied. In the method, torque can be transmitted through one set of radial projections of a torque monitoring apparatus having two sets of radial projections. The exemplary embodiments can be applied in a turbine engine or in any other operating environment in which torque is transmitted.

FIG. 1 schematically shows a turbine engine 10. The various unnumbered arrows represent the flow of fluid through the turbine engine 10. The turbine engine 10 can produce power for several different kinds of applications, including vehicle propulsion and power generation, among others. The exemplary embodiments of the invention disclosed herein, as well as other embodiments of the broader invention, can be practiced in any configuration of turbine engine and in any application other than turbine engines in which torque is transmitted.

The exemplary turbine engine 10 can include an inlet 12 to receive fluid such as air. The turbine engine 10 may include a fan to direct fluid into the inlet 12 in alternative embodiments of the invention. The turbine engine 10 can also include a compressor section 14 to receive the fluid from the inlet 12 and compress the fluid. The compressor section 14 can be spaced from the inlet 12 along a centerline axis 16 of the turbine engine 10. The turbine engine 10 can also include a combustor section 18 to receive the compressed fluid from the compressor section 14. The compressed fluid can be mixed with fuel from a fuel system 20 and ignited in an annular combustion chamber 22 defined by the combustor section 18. The turbine engine 10 can also include a turbine section 24 to receive the combustion gases from the combustor section 18. The energy associated with the combustion gases can be converted into kinetic energy (motion) in the turbine section 24.

In FIG. 1, shafts 26, 28 are shown disposed for rotation about the centerline axis 16 of the turbine engine 10. Alternative embodiments of the invention can include any number of shafts. The shafts 26, 28 can be journaled together for relative rotation. The shaft 26 can be a low pressure shaft supporting compressor blades 30 of a low pressure portion of the compressor section 14. The shaft 26 can also support low pressure turbine blades 32 of a low pressure portion of the turbine section 24.

The shaft 28 encircles the shaft 26. As set forth above, the shafts 26, 28 can be journaled together, wherein bearings are disposed between the shafts 26, 28 to permit relative rotation. The shaft 28 can be a high pressure shaft supporting compressor blades 34 of a high pressure portion of the compressor section 14. The shaft 28 can also support high pressure turbine blades 36 of a high pressure portion of the turbine section 24.

The low pressure shaft 26 can drive other structures, such as a gear train, a fan, a propeller shaft, a rotor, a tower shaft or any other shaft, or any other structure. In the schematic view of FIG. 1, the low pressure shaft 26 can be coupled to a reduction gear box 38, an intermediate shaft 40, a torque monitoring apparatus 42, and a propeller shaft 44. The reduction gear box 38 can be coupled directly with the low pressure shaft 26 and can transmit torque/rotation from the low pressure shaft 26 to the intermediate shaft 40 at a reduced angular velocity. The torque monitoring apparatus 42 can communicate torque/rotation from the intermediate shaft 40 to the propeller shaft 44 without a reduction in angular velocity.

The torque monitoring apparatus 42 can include a first portion 46 and a second portion 48. The first and second portions 46, 48 can move relative to one another during the transmission of torque between the low pressure shaft 26 and the propeller shaft 44. For example, the first and second portions 46, 48 can twist relative to one another about the axis of rotation. In FIG. 1, the axis of rotation can be the centerline axis 16, however, the axis of rotation of the torque monitoring apparatus 42 can be different than the centerline axis 16 in alternative embodiments of the invention. The first and second portions 46, 48 can twist relative to one another across a torque transmitting plane, represented by line 50. The torque monitoring apparatus 42 can have a minimized cross-sectional area in the torque transmitting plane 50 to permit the relative, twisting movement between the first and second portions 46, 48.

The extent of relative movement between the first and second portions 46, 48 can be monitored and correlated to a level of torque. For example, one or more sensors, such as first and second sensors 52, 54 can be positioned to sense one or more structural features of the first and second portions 46, 48, respectively. These structural features in the exemplary embodiments of the invention will be discussed in greater detail below. The sensors 52, 54 can each communicate respective, sensed conditions to a controller 56 in the form of signals. For example, the sensors 52, 54 can be proximity sensors and communicate the condition of proximity with some structure to the controller 56. The controller 56 can receive signals from the sensors 52, 54 and apply programmable logic to convert the signals, individually or in combination, into a level of torque. The sensing methodology can be any sensing methodology known in the art, including light sensing, magnetic/proximity sensing, or any other approach to sensing movement or position.

Figure 2:
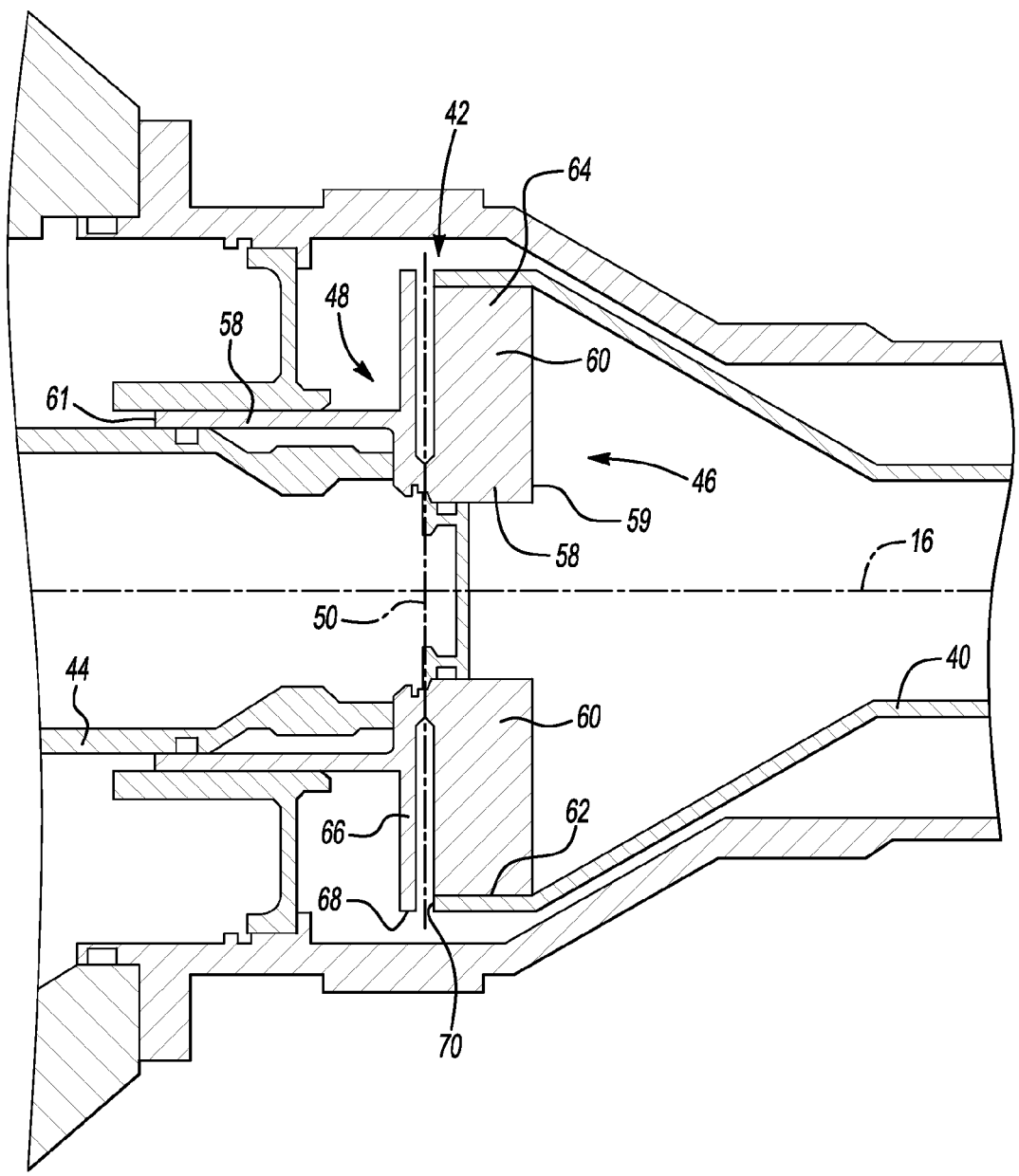
FIG. 2 is a cross-sectional view of the exemplary embodiment of the invention.

FIG. 2 is detailed cross-sectional view of the exemplary embodiment of the invention. The torque monitoring apparatus 42 is shown having the first portion 46 and the second portion 48. The torque monitoring apparatus 42 can include a hub 58 that extends along the axis 16 of rotation between first and second opposite ends 59, 61. The hub 58 can traverse both the first and second portions 46, 48 of the torque monitoring apparatus 42.

Figure 3:
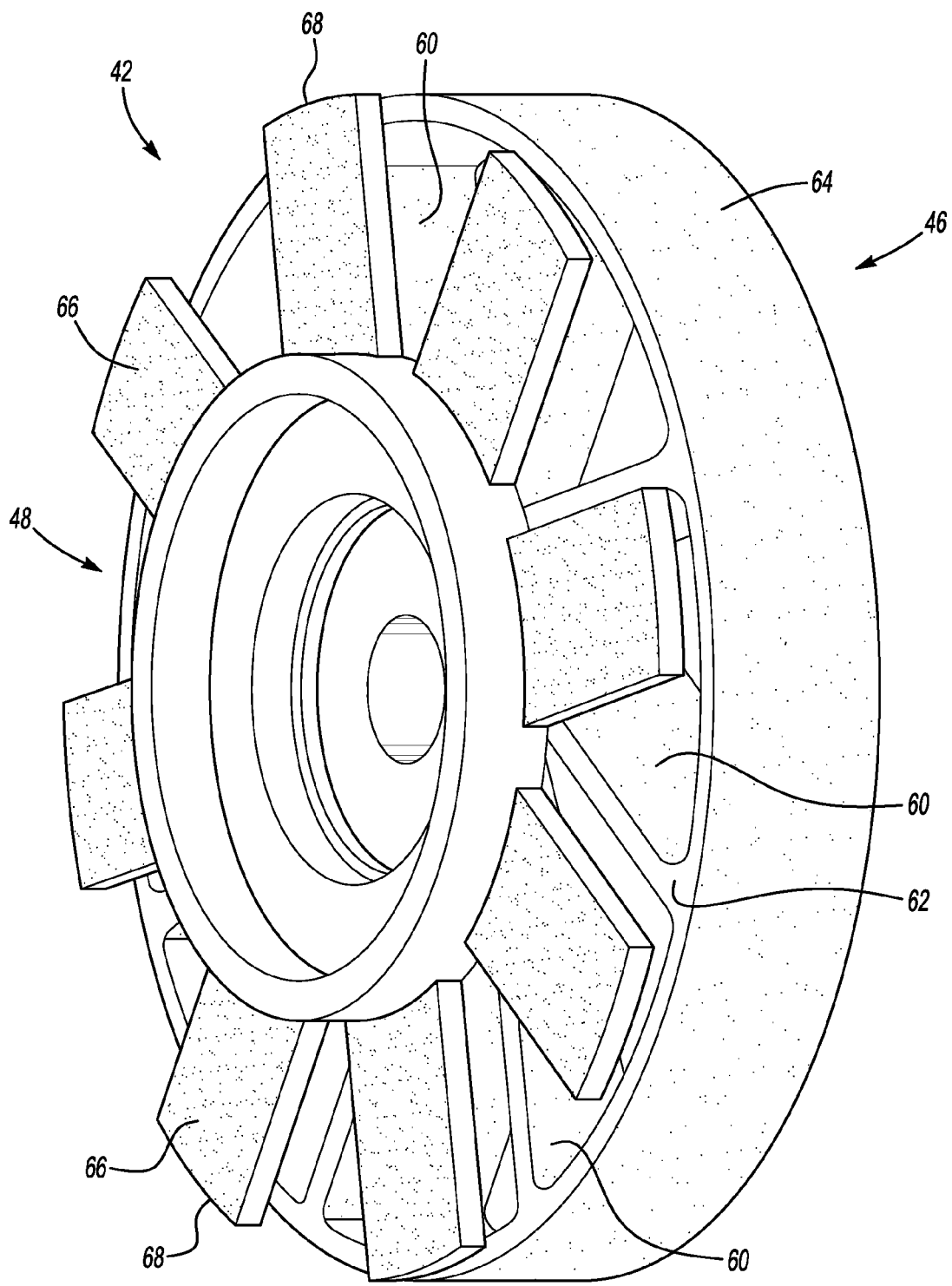
FIG. 3 is a perspective view of the exemplary embodiment of the invention shown in FIG. 2.

The torque monitoring apparatus 42 also includes a first plurality of projections or spokes 60 positioned on the hub 58 along the first portion 46. The spokes 60 can extend radially outward from the hub 58 to respective distal ends 62. As shown in FIG. 3, the distal ends 62 can be interconnected with one another through a hoop 64. The hoop 64 can be welded to the input shaft, such as the intermediate shaft 40 shown in FIG. 2. Thus, through the hoop 64, the distal ends 62 can be fixed to the input shaft. The inclusion of the hoop 64 can make the assembly of the torque monitoring apparatus 42 to the input shaft 40 easier by providing a continuous surface or edge 70, shown in FIG. 2, for welding about the axis 16. However, the hoop 64 is not required of the invention.

Referring again to FIG. 2, the torque monitoring apparatus 42 also includes a second plurality of projections 66 spaced from the plurality of spokes 60 along the axis 16 of rotation. Each of the plurality of projections 66 can extend radially outward from the hub 58 along the second portion 48 to respective distal ends 68. As shown in FIG. 3, the distal ends 68 of the plurality of projections 66 are circumferentially unconnected from one another. Forming the torque monitoring apparatus 42 such that the distal ends 68 are unconnected with one another can be desirable since unconnected ends 68 can be easier to detect by sensors, such as sensor 54 in FIG. 1.

Referring again to FIG. 2, the plurality of projections 66 are thinner along the axis 16 than the plurality of spokes 60. The thickness of the projections 66 can be minimized. As a result, the torque monitoring apparatus 42 can be more compact along the axis 16.

In exemplary embodiment of the invention, the path of torque transfer can include the input shaft or intermediate shaft 40, the hoop 64, the projections 60, the hub 58, and the output shaft or propeller shaft 44. The projections 66 can be positioned outside of the path of torque transfer. The output shaft 44 can be fixed directly to the hub 58 in the exemplary embodiment of the invention. The exemplary hub 58 encircles the propeller shaft 44 in the exemplary embodiment, but could be positioned internally of the output shaft in alternative embodiments of the invention.

Removing the projections 66 from the path of torque transfer provides greater flexibility in shaping the projections 66 and in positioning the projections 66 along the hub 58. The projections 66 can be positioned anywhere along the hub 58, such as closer to the plurality of spokes 60 than to either of the first and second ends 59, 61. The plurality of projections 66 can be positioned along the axis 16 spaced from both of the first and second ends 59, 61. The spokes 60, on the other hand, can be positioned along the axis 16 of rotation substantially proximate to the first end 59 since it is not necessary for the hub 58 to be overlapping the input shaft, other than the overlap of the axial thickness of the spokes 60.

Each the projections 60, 66 can define a circumferential profile. The circumferential profile can be defined by axial thickness (in the direction along the axis 16) and circumferential thickness (in the direction about the axis 16). In the exemplary embodiment of the invention, the projections 66 can have a different circumferential profile than the spokes 60 since the axial thicknesses of the spokes 60 and projections 68 are different. In addition, the projections 66 can be thicker or wider circumferentially about the axis 16 than the spokes 60. By shaping the circumferential profile of the projections 66 wider, the projections 66 can be easier to detect by sensors, such as sensor 54 in FIG. 1. It is noted that a portion of the spokes 60 can extend past the edge 70 shown in FIG. 2, into the gap that otherwise exists between the projections 66 and the spokes 60. This portion of the spokes 60 can be sensed or detected by a sensor, such as sensor 52 in FIG. 1.

Referring again to FIG. 2, in the exemplary embodiment of the invention the hub 58, the plurality of spokes 60, and the plurality of projections 66 can be integrally-formed with respect to one another. In alternative embodiments of the invention, one or two of these components of the torque monitoring apparatus 42 can be separately formed with respect to the other components and then subsequently connected together.

Figure 4:
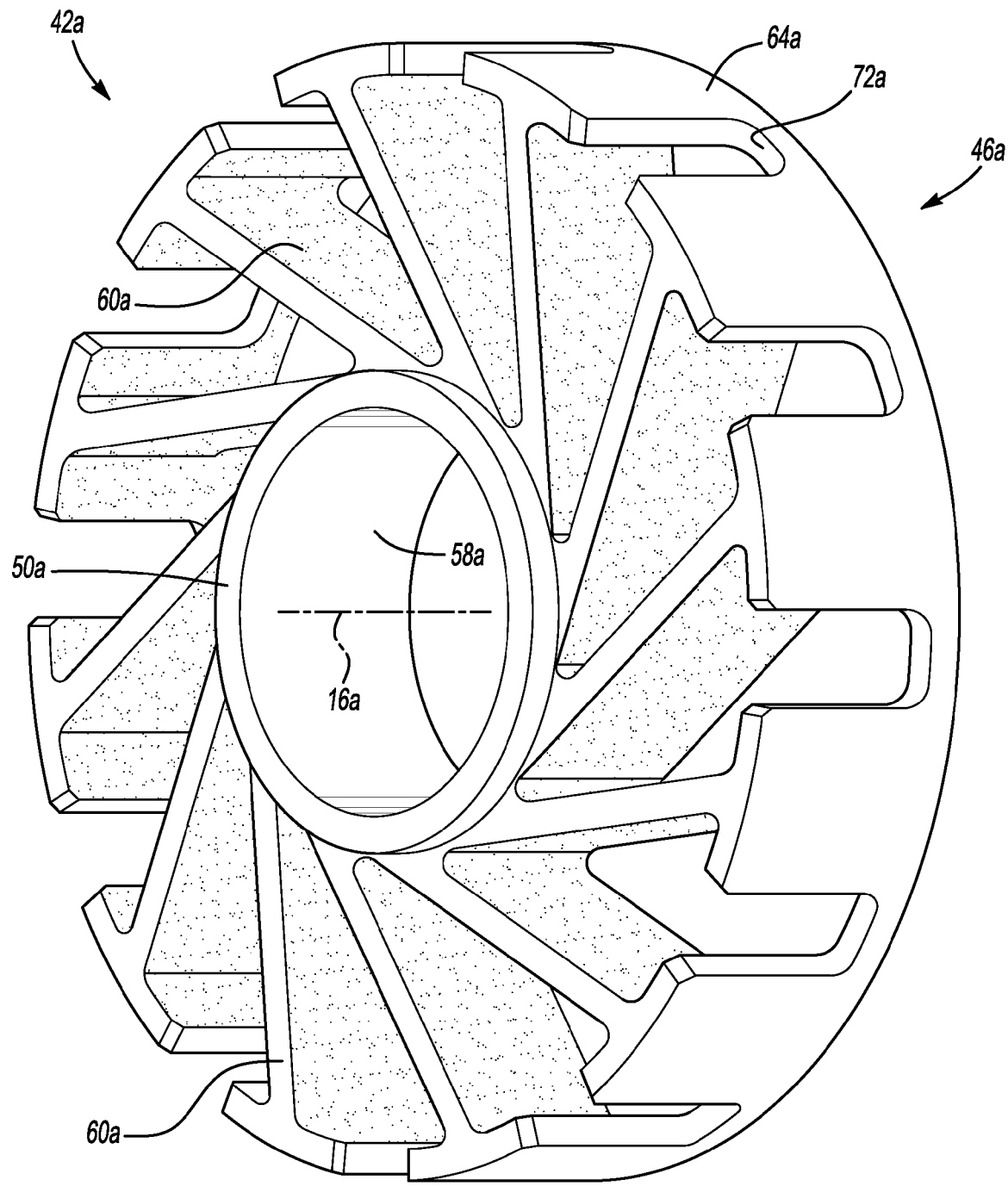
FIG. 4 is a partial perspective view of another exemplary embodiment of the invention.
Figure 5:
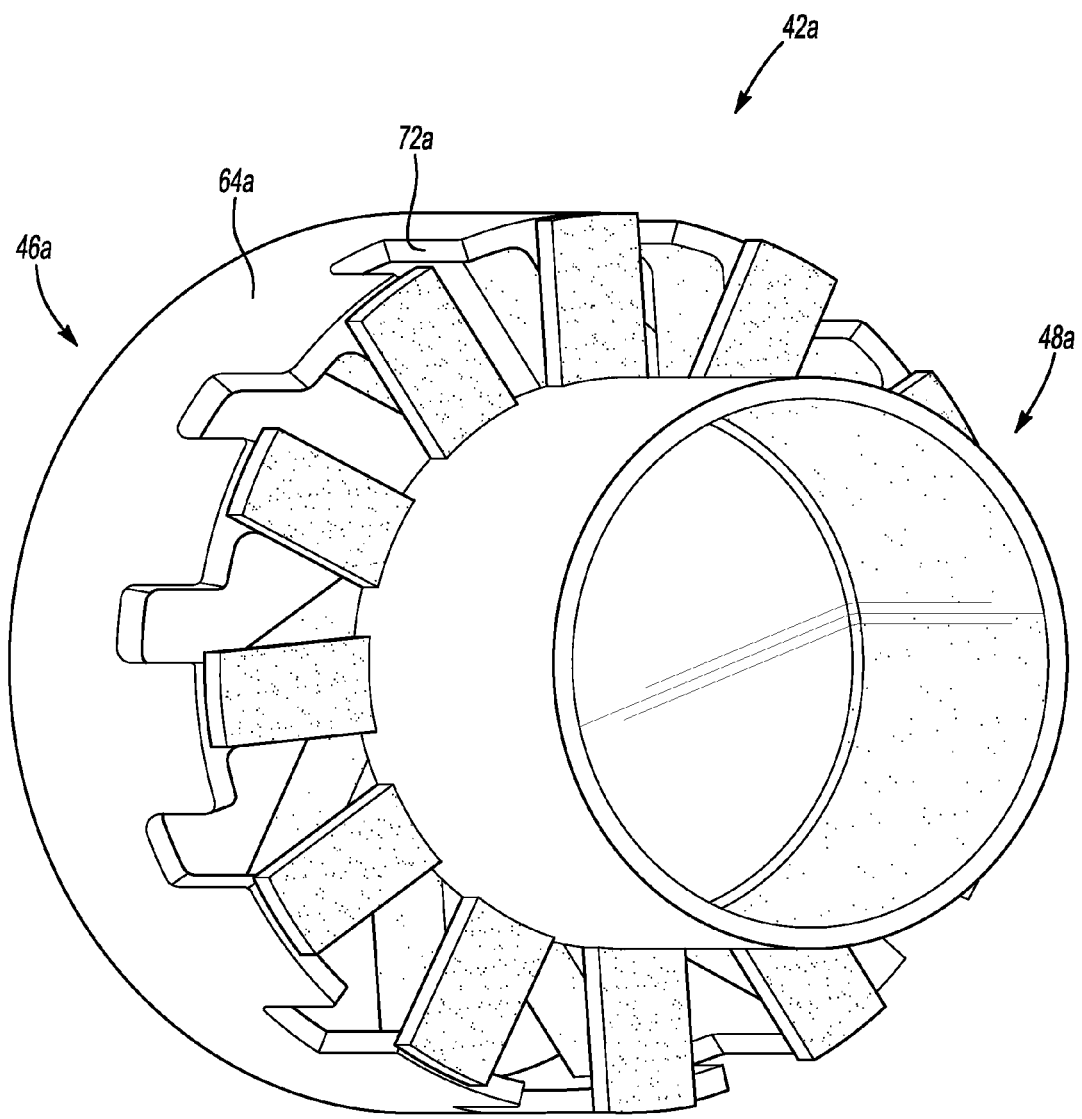
FIG. 5 is a full perspective view of the exemplary embodiment of the invention shown in FIG. 4.

A portion of an alternative embodiment of the invention is shown in FIG. 4. FIG. 4 shows a first portion 46a of a torque monitoring apparatus 42a. The second portion 48a of the torque monitoring apparatus 42a is shown in FIG. 5. Referring again to FIG. 4, a portion of a hub 58a is also shown as well as a plurality of spokes 60a. The exemplary spokes 60a extend radially outward and can be at least partially tangent to the hub 58a. Extending the spokes 60a at least partially tangent to the hub 58a allows the spokes 60a to flex to greater extent than the spokes 60 which extend normal to the hub 58 (shown in FIG. 2) for the same level of torque. Flexing that is more pronounced is easier to sense or detect.

The torque monitoring apparatus 42a can also include a hoop 64a. The hoop 64a includes a plurality of notches 72a circumferentially spaced from one another about the axis 16a of rotation. The hoop 64a can thus have a variable axial width or thickness about the axis 16a. Each of the notches 72a or partial-gaps can be defined between two adjacent spokes 60a. The notches 72a can decrease the stiffness of the hoop 64a and allow the spokes 60a to deflect a greater amount and thereby be easier to detect. The notches 72a can also be a desirable feature in that the portions of the hoop 64a between two notches 72a can be sensed for the torque determination.

Another advantage provided by the exemplary embodiments relates to longitudinal stiffness. For example, given a particular axial space for placement of a torque monitoring apparatus, the single set of torque-transmitting spokes can be larger (axially-wider) and therefore provide greater stiffness relative to a bending moment.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Also, while this document may draw attention to certain features believed to be of particular importance, it should be understood that the Applicant claims protection in respect of any patentable feature or combination of features hereinbefore referred to and/or shown in the drawings whether or not particular emphasis has been placed thereon.

What is claimed is:

1. A torque monitoring apparatus comprising:
    a hub extending along an axis of rotation between first and second opposite ends;
    a plurality of spokes positioned on said hub and extending radially outward from said hub to respective distal ends; and
    a plurality of projections spaced from said plurality of spokes along said axis of rotation and extending radially outward from said hub to respective distal ends, wherein said plurality of projections are thinner along said axis than said plurality of spokes.

2. The torque monitoring apparatus of claim 1 further comprising: a hoop interconnecting said distal ends of said plurality of spokes.

3. The torque monitoring apparatus of claim 2 wherein said distal ends of said plurality of projections are circumferentially unconnected from one another.

4. The torque monitoring apparatus of claim 2 wherein said hoop includes a plurality of notches circumferentially spaced from one another about said axis of rotation.

5. The torque monitoring apparatus of claim 1 wherein said plurality of projections have a different circumferential width about said axis than said plurality of spokes.

6. The torque monitoring apparatus of claim 5 wherein at least some of said plurality of projections are circumferentially wider than at least some of said plurality of spokes.

7. The torque monitoring apparatus of claim 1 wherein said plurality of projections are positioned on said hub along said axis of rotation closer to said plurality of spokes than to either of said first and second ends.

8. The torque monitoring apparatus of claim 1 wherein plurality of spokes are positioned along said axis of rotation substantially proximate to said first end and said plurality of projection are positioned along said axis of rotation spaced from both of said first and second ends.

9. The torque monitoring apparatus of claim 1 wherein said plurality of spokes extend radially outward at least partially tangent to said hub.

10. A method comprising the steps of:
    connecting an input shaft and an output shaft together through a torque monitoring apparatus extending along an axis of rotation and having a hub and first and second sets of radial projections; and
    transmitting torque through only the first set of radial projections.

11. The method of claim 10 further comprising the step of:
    minimizing the thickness of the second set of radial projections along the axis of rotation relative to the thickness of the first set of radial projections.

12. The method of claim 10 further comprising the step of:
    shaping respective circumferential profiles of the first and second sets of radial projections differently from one another.

13. The method of claim 10 further comprising the step of:
    interconnecting distal ends of only the first set of radial projections.

14. A turbine engine comprising:
    an input shaft rotatable about an axis;
    an output shaft rotatable about the axis;
    a torque monitoring apparatus having:
        a hub extending along the axis between first and second opposite ends;
        a plurality of spokes positioned on said hub and extending radially outward from said hub to respective distal ends fixed to said input shaft; and
        a plurality of projections spaced from said plurality of spokes along said axis and extending radially outward from said hub to respective distal ends, wherein said plurality of projections are thinner along said axis than said plurality of spokes.

15. The turbine engine of claim 14 wherein said output shaft is fixed directly to said hub.

16. The turbine engine of claim 14 further comprising:
    a first sensor operable to sense a position of at least one of said plurality of spokes;
    a second sensor operable to sense a position of at least one of said plurality of projections; and
    a controller operable to communicate with both of said first and second sensors and determine torque across said torque monitoring apparatus based on the relative positions of said at least one of said plurality of spokes and said at least one of said plurality of projections.

17. The turbine engine of claim 14 wherein at least one of said plurality of spokes extends substantially tangent to said hub.

18. The turbine engine of claim 17 wherein said plurality of projections extends normal relative to said hub.

19. The turbine engine of claim 14 further comprising: a hoop interconnecting said distal ends of said plurality of spokes and having a variable width about said axis.

20. The turbine engine of claim 14 wherein said hub, said plurality of spokes, and said plurality of projections are integrally-formed with respect to one another.

* * * * *